Patented Mar. 27, 1945

2,372,562

UNITED STATES PATENT OFFICE 2,372,562

ACETOPHENONE

William S. Emerson, Van Buren Township, Montgomery County, Ohio, assignor to Monsanto Chemical Company, a corporation of Delaware No Drawing. Application August 28, 1942, Serial No. 456,533

2 Claims. (Cl. 260—592)

This invention relates to a method for the preparation of acetophenone from alpha-chlorostyrene.

In the preparation of acetophenone the methods followed heretofore have been based particularly upon the Friedel-Crafts reaction, involving the condensation of benzene with acetyl chloride, acetic anhydride, various acetates or ketene in the presence of metal halide catalysts, especially aluminum chloride. Such methods have been characterized by high catalyst costs, the employment of molecular equivalents of, for example, aluminum chloride, being essential in the Friedel-Crafts synthesis of ketones and the recovery of such catalysts in the desirably anhydrous state being impracticable. Acetophenone has likewise been prepared by a variety of other methods, but the prior processes have been of little industrial interest in that they have been characterized not only by high costs but also by uncertain yields and atttended with various other difficulties. For example, it was long ago known to heat alpha-chlorostyrene with concentrated hydrochloric acid to a yield a mixture of triphenylbenzene and acetophenone (A. Behal. Bull. soc. chim. (2), 50, 637, (1888)). In a further experiment recorded in the literature a good yield of acetophenone was obtained by boiling for three hours a mixture of chlorostyrene with more than 3 times its amount by weight of concentrated hydrochloric acid (E. Urion and L. Namias. Bull. soc. chim. (5), 3, 2336 (1936)). This method is costly because under the reaction conditions it is impossible to prevent volatilization and consequent dissipation of the concentrated hydrochloric acid. Moreover, the diffusion of the volatilized hydrogen chloride throughout the reaction equipment causes considerable corrosion; so that the principles here involved never led to any practical application.

I have attempted the conversion of alpha-chlorostyrene into acetophenone by employing various dilute concentrations of hydrochloric acid instead of the strong acid in order to eliminate corrosion problems and loss of hydrogen chloride. However, the use of such diluted hydrochloric acids resulted in only negligible yields of acetophenone.

The present invention is based on the discovery that certain concentrations of sulfuric acid, within narrow limits, give improved yields of acetophenone from alpha-chlorostyrene and that the concentrations of sulfuric acid most advantageously employed are such as are not corrosive to the reaction equipment under the reaction conditions.

As an olefinic, unsaturated compound, alpha-chlorostyrene would be expected to be adversely affected by sulfuric acid; that is, either charring, sulfonation, polymerization or oxidation would be expected to precede and prevail over the reaction involving the conversion of alpha-chlorostyrene to acetophenone. As a matter of fact, unless reaction conditions as herein defined are carefully adhered to, only heterogenous products are obtained by reaction of alpha-chlorostyrene with sulfuric acid.

When alpha-chlorostyrene is heated with approximately 5 times its weight of 80% aqueous sulfuric acid, I obtain a good yield of acetophenone; however, when I increase the concentration of the acid to 85%, the yield of acetophenone is reduced to about 60% of that secured with the 80% acid. Likewise, when I employ a 75% concentration of the acid instead of the 80% acid, I obtain a similar reduction in yields.

The present invention is illustrated by the following example:

Add 20 g. of alpha-chlorostyrene to 100 g. of a cold, substantially 80% aqueous solution of sulfuric acid. Warm the resulting mixture to a temperature of about 60° C., and allow it to remain at this temperature until the evolution of hydrogen chloride has ceased, generally requiring approximately 5 hours. Extract the product with benzene and distil the benzenes extract under partial vacuum. 14 g. (81% yield of acetophenone is recovered.

The use of an 85% sulfuric acid at a temperature facilitating a steady and non-violent evolution of hydrogen chloride, i. e., at 30° C. results in the production of a 46% yield of acetophenone. When I employ a weaker acid, I preferably use correspondingly higher temperatures. With 75% sulfuric acid at temperatures of from 80° C. to 100° C. I obtain a 54% yield of acetophenone. On the other hand, with 96% sulfuric acid, ordinary room temperature or even lower temperatures are advantageously used in order to avoid charring. With 96% sulfuric acid, there is a decrease in yield, only 23% of the ketone being obtainable.

Hence, while I may operate at acid concentrations of from 70% to 96%, in order to obtain the best yields of acetophenone, I prefer to employ acid concentrations of from, say, 78% to 82%. When using acids within this range of concentration I have found that temperatures of 55° C. to 65° C. are advantageously employed, this range of temperature being conducive to a steady, smooth evolution of reaction hydrogen chloride and the formation of maximum yields of acetophenone in the shortest time. Lower temperatures may be employed, but temperatures which are essentially lower than, say, 40° C. are inadvisable in that at these temperatures with sulfuric acid or from 78% to 82% concentration only a very low reaction rate is attainable. Generally, the optimum reaction temperature is taken to be that at which, with the individual concentration of the acid employed, hydrogen chloride is liberated steadily and without violence. Accordingly the temperature of the reacting solution is so controlled, within the range herein specified, as to employ the higher temperatures in combination with lower concentrations of acid, and likewise the lower temperatures with the higher concentrations of acid.

What I claim is:

1. A process which comprises reacting alpha-chloro-styrene with sulfuric acid of from approximately 78% to approximately 82% $H_2SO_4$ content and controlling the temperature of the reaction within the range of from approximately 55° C. to approximately 65° C., the higher temperature corresponding to the lower acid concentration and vice versa.

2. A process which comprises reacting alpha-chloro-styrene with sulfuric acid of substantially 80% $H_2SO_4$ content while maintaining the temperature at a point to cause a regular and non-violent evolution of hydrogen chloride.

WILLIAM S. EMERSON.